United States Patent
Lehofer et al.

(10) Patent No.: US 9,135,138 B2
(45) Date of Patent: Sep. 15, 2015

(54) METHOD AND SYSTEM FOR TRACING INDIVIDUAL TRANSACTIONS OVER MESSAGING SYSTEMS WITHOUT ADDING TRACING INFORMATION TO MESSAGES

(71) Applicant: Compuware Corporation, Detroit, MI (US)

(72) Inventors: Andreas Lehofer, St. Florian (AT); Bernhard Liedl, Ottensheim (AT); Dominik Punz, Linz (AT); Thomas Kockerbauer, Mittertreffling (AT)

(73) Assignee: Dynatrace LLC, Detroit, MI (US)

( * ) Notice: Subject to any disclaimer, the term of this patent is extended or adjusted under 35 U.S.C. 154(b) by 0 days.

(21) Appl. No.: 14/085,882

(22) Filed: Nov. 21, 2013

(65) Prior Publication Data

US 2014/0149803 A1  May 29, 2014

Related U.S. Application Data

(60) Provisional application No. 61/731,008, filed on Nov. 29, 2012.

(51) Int. Cl.
| | |
|---|---|
| *G06F 3/00* | (2006.01) |
| *G06F 9/46* | (2006.01) |
| *G06F 15/16* | (2006.01) |
| *G06F 11/34* | (2006.01) |
| *H04L 12/26* | (2006.01) |
| *H04L 12/24* | (2006.01) |
| *H04L 29/06* | (2006.01) |
| *G06F 9/54* | (2006.01) |

(52) U.S. Cl.
CPC ........ *G06F 11/3495* (2013.01); *H04L 41/0631* (2013.01); *H04L 43/10* (2013.01); *G06F 9/466* (2013.01); *G06F 9/542* (2013.01); *G06F 11/3409* (2013.01); *G06F 2201/86* (2013.01); *G06F 2201/87* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 8,234,631 B2 | 7/2012 | Greifeneder et al. | |
| 2003/0046395 A1* | 3/2003 | Fleming et al. | 709/226 |
| 2004/0122862 A1* | 6/2004 | Todd | 707/104.1 |
| 2009/0025011 A1* | 1/2009 | Neil et al. | 719/314 |
| 2010/0211554 A1* | 8/2010 | Reid et al. | 707/703 |
| 2011/0264790 A1* | 10/2011 | Haeuptle et al. | 709/224 |
| 2014/0195632 A1* | 7/2014 | Hunter et al. | 709/213 |

* cited by examiner

*Primary Examiner* — H S Sough
*Assistant Examiner* — Phuong Hoang
(74) *Attorney, Agent, or Firm* — Harness, Dickey & Pierce, P.L.C.

(57) ABSTRACT

A performance monitoring system is presented for monitoring and tracing individual transactions, where transaction processing includes sending and receiving messages using messaging systems that do not allow the augmentation of existing messages with monitoring system specific correlation information. Agents are deployed to sender and receiver applications that monitor and report transactions. Both sender and receiver applications are instrumented with sensors that detect and report sending or receiving of such immutable messages. Those sensors also extract correlation data from sent and received data allowing the identification of matching corresponding send/receive pairs. A mapping agent is used to retrieve mapping information from a messaging system which may alter the additional message identification data while messages travel through the system. This mapping information is additionally used for the correlation process.

29 Claims, 11 Drawing Sheets

```xml
<mqmappingconfig memento.version="5.0.0.3770">
  <tagcontents msgid="true" qname="true" qmgrname="true" correlid="false" />
  <queuemanager port="3416" id="QM1_2012-09-04" channelname="SVRCONN" name="QM1" hostname="qsrv">
    <queue name="ALIAS_QUEUE" type="ALIAS" basequeue="CLUSTER_QUEUE" />
    <cluster name="TESTCLUSTER" />
  </queuemanager>
  <queuemanager port="3415" id="QM2_2012-09-04" channelname="SVRCONN" name="QM2" hostname="qsrv">
    <queue name="CLUSTER_QUEUE" type="LOCAL">
      <cluster name="TESTCLUSTER" />
    </queue>
  </queuemanager>
</mqmappingconfig>
```

(Line labels: 901L, 902L, 903L, 904L, 905L, 906L, 907L, 908L)

FIG. 9

METHOD AND SYSTEM FOR TRACING INDIVIDUAL TRANSACTIONS OVER MESSAGING SYSTEMS WITHOUT ADDING TRACING INFORMATION TO MESSAGES

CROSS-REFERENCE TO RELATED APPLICATIONS

This application claims the benefit of U.S. Provisional Application No. 61/731,008, filed on Nov. 29, 2012. The entire disclosure of the above application is incorporated herein by reference.

FIELD

The present disclosure relates to tracing individual transactions over messaging systems without adding tracing information to the messages.

BACKGROUND

Traditional transaction tracing systems capable of tracing individual transactions at function or method level use active tagging mechanisms which alter messages by adding correlation data that allow identification and correlation of corresponding sender/receiver pairs. Some systems, like Websphere MQ, do not provide a way to attach additional correlation information to existing messages without introducing a risk of breaking the original application functionality. Therefore, it is desirable to develop techniques for tracing individual transactions handled by a message oriented middleware or other messaging mechanisms without adding tracing information to the messages.

There exist other communication mechanism that may be used by distributed transactions that do not allow the usage of active tagging mechanism, e.g. due to a communication protocol that does not allow to add additional correlation data to existing communication messages without risking a communication breakdown. An example for such communication mechanisms is "distributed program link" (DPL) which allows communication between different CICS processes. CICS processes communicating via DPL may run in different CICS regions.

Consequently, a tagging solution is desire that allows to correlate sender and receiver pairs of a distributed transaction without transferring additional correlation data from sender to receiver.

This section provides background information related to the present disclosure which is not necessarily prior art.

SUMMARY

Embodiments of the disclosed system allow identifying and correlating tracing data of two parts of a distributed transaction, where one part sends a message, and the other receives and handles the sent message, without adding correlation data to the message. Such embodiments may use identification data already available in the message to perform the correlation.

Other embodiments may use message routing information, like message queue names and message queue manager names of queues and queue managers used to transfer the messages, to improve the correlation accuracy in cases where the message identification data alone does not identify a message.

Yet other embodiments may use message routing information to create and maintain mapping information that allows identifying corresponding input and output queue in cases when mechanisms like clustered queues and queue aliases cause different identification names for input queues and corresponding output queues.

Still other embodiments may use the extracted mapping information to determine the sequence of tracing data describing message handling by an intermediate processing node that reads messages from a queue, manipulates them and puts them into another queue, and the tracing data describing the message handling by the final recipient.

Yet other embodiments may combine active and passive tagging mechanisms and may automatically detect according properties of the used communication method if the communication method supports active tagging. According to the result of this detection, such embodiments may autonomously use the appropriate tagging mechanism.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

DRAWINGS

FIG. 9 shows exemplary mapping data and correlation configuration in form of an XML file;

Figure 1:
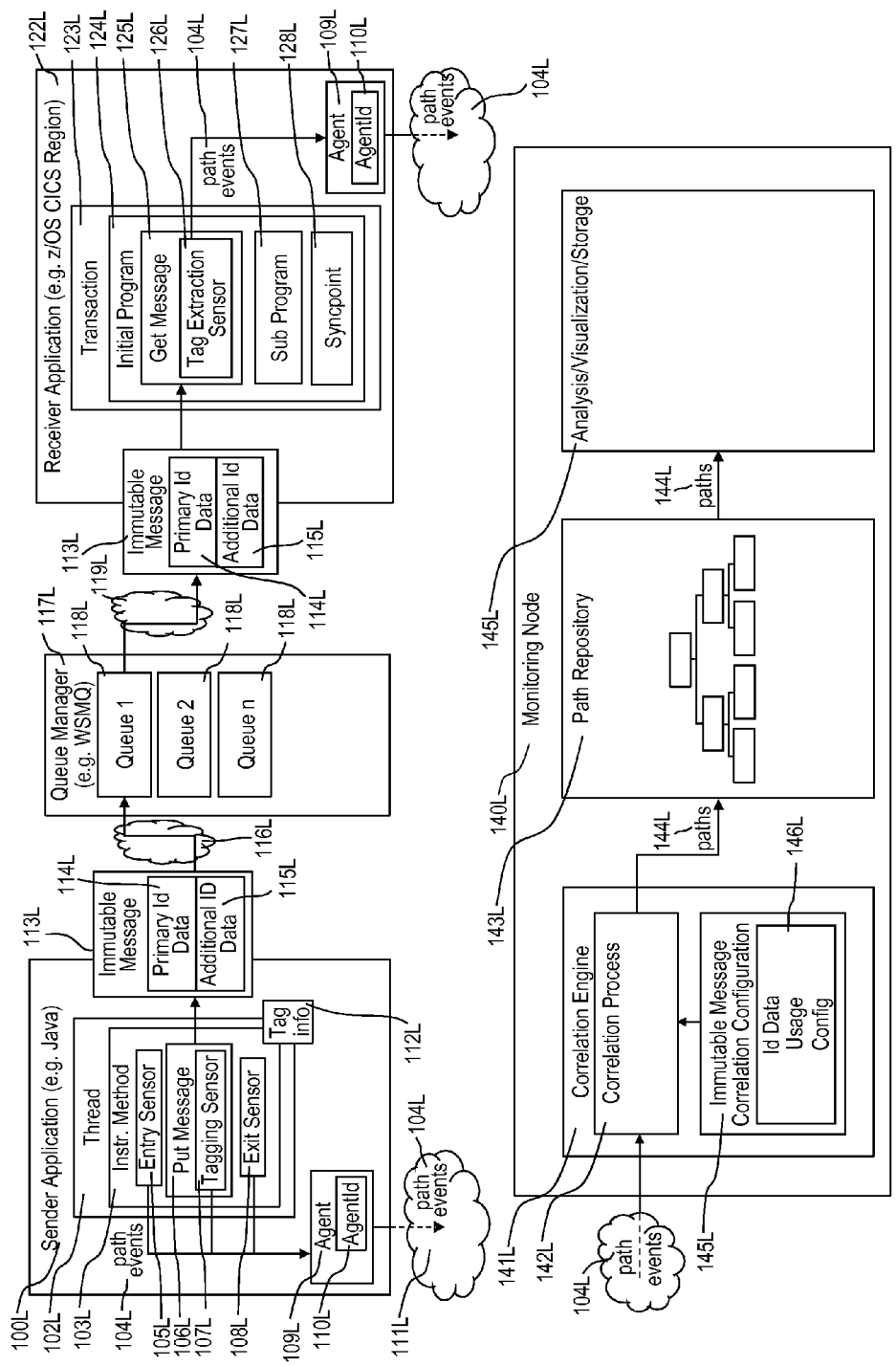
FIG. 1 is a block diagram of an application using a message queue system for communication and a monitoring system configured to monitor the application.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

Embodiments of the described invention may use byte code manipulation to place sensors providing transaction performance measurement and correlation data in byte code based parts of monitored applications. Those embodiments may also use mechanisms like user exits in CICS based parts of monitored applications to fetch transaction performance measurement and correlation data. Both mechanisms allow adding monitoring specific functionality to existing applications at runtime, without the need to manipulate application source code or to recompile application source code.

FIG. 1 provides an overview of an exemplary monitoring system that monitors transactions across a distributed computing environment. The system includes one or more applications that communication using a queue based messaging mechanism. In an exemplary embodiment, message queuing may be implemented using the WebSphere MQ message oriented middleware although other implementations are also contemplated by this disclosure. Moreover, while reference is made to message queuing, the broader aspects of this disclosure are applicable to other types of communication mechanisms which do not allow dynamic alterations of the transferred data to inject monitoring system specific correlation data into the transferred communication data.

An agent 109L with an agentId 110L is deployed to a sender application 100L. The agentId identifies the specific agent and the sender application for the monitoring node 140L. The sender application executes a monitored transaction within a thread 102L. The transaction executes an instrumented method 103L which is instrumented by an entry sensor 105L and an exit sensor 108L that detect entry and exit of the method and report this to the monitoring node 140L. The instrumented method 103L calls a put message method 106L to put an immutable message 113L into a messaging system constituted of a queue manager 117L. Calling the put message method causes the execution of a tagging sensor 107L which is instrumented into the put message method and which reports the sending of the message to the monitoring node 140L in form of path events 104L. The term "immutable message" is used herein to describe a type of message that cannot safely be manipulated by a monitoring system to e.g. inject correlation data without risking application failure. The original application may be allowed to manipulate such messages. For further details regarding an active tagging technique that injects and transfers correlation data from sender to receiver, reference may be made to U.S. Pat. No. 8,234,631 which is incorporated in its entirety herein by reference. The tagging concepts described therein may be combined with the concepts and processes described in this document to create a monitoring system capable to use both active and passive tagging mechanism.

A Tag info node 112L may be maintained in a thread local storage to store thread internal and intra thread correlation data according to the teachings of U.S. Pat. No. 8,234,631.

Besides the payload data, the sent immutable message 113L may contain primary Id data 114L that may be used to identify individual messages at application level and additional Id data 115L that may be used by a monitoring system as additional identification attributes in case the primary id data is not sufficient to identify individual messages. Such situations may e.g. arise when the monitoring system monitors multiple applications sending messages to the same message receiver. Each monitored application maintains its own messages and assures that primary id data 114L is sufficient to identify a message. But it is not guaranteed that the primary Id data uniquely identifies a message within the scope of all monitored applications. Such situations may cause erroneous transaction tracing results. To overcome this and to improve correlation accuracy, additional Id data may be used by the monitoring system.

Primary Id data 114L may contain but is not limited to a messageId, a message timestamp or a correlationId. Additional Id data 115L may contain but is not limited to a queue name, a queue manager name or a queue cluster name. Additional Id data may be used to identify the messaging system used to transfer a message.

The immutable message 113L is transferred to a queue manager 117L using a computer network 116L and placed in queue 1 118L. The queue manager may provide other queues like queue 2 to queue n 118L which may be used by other applications.

In the exemplary embodiment, a receiver application 122L executes a transaction 123L, which at a certain point of execution invokes a get message function 125L which receives the immutable message 113L from queue 1 of the queue manager 117L. A tag extraction sensor 126L may be instrumented to the get message function 125L which reports the received message to the monitoring node 140L in form of path events. Afterwards, execution of the transaction 123L may continue by execution of one or more sub programs 127L which may also contain sensors reporting the state of the transaction execution to the monitoring node 140L. Transaction execution may be finished when a syncpoint 128L is reached. The tagging sensor 126L as well as all other sensors may send generated tracing data to an agent 109L which then forwards the tracing data to the monitoring node 140L.

In one embodiment, the receiver application may be further defined as a Customer Information Control System (CICS) transaction server operating in a z/OS CICS region. Although agents and sensors deployed in the distributed sender application may fundamentally deviate from agents and sensors deployed in the receiver applications, those deviations are of no importance to the scope and spirit of the presented monitoring methods. Those deviations are thus omitted in this specification. A detailed descriptions of a monitoring system containing agents and sensors deployed to CICS environment may be found in U.S. patent application Ser. No. 13/910,587 which is incorporated in its entirety herein by reference.

The monitoring node 140L includes a correlation engine 141L which executes a correlation process 142L to create end-to-end transaction tracing data out of received path events 104L, a path repository 143L containing transaction tracing data describing individual transactions, and an analysis/visualization/storage module that uses the end-to-end tracing data stored in the path repository 143L for various purposes, including but not limited to visualization, analysis and storage.

The correlation of transaction tracing data describing transaction parts interconnected by the sending and receiving of immutable messages 113L may be controlled by immutable message correlation configuration data 145L, which may contain an Id data usage configuration 146L that defines which parts of additional Id data 115L should be used for the correlation process.

Figure 2:
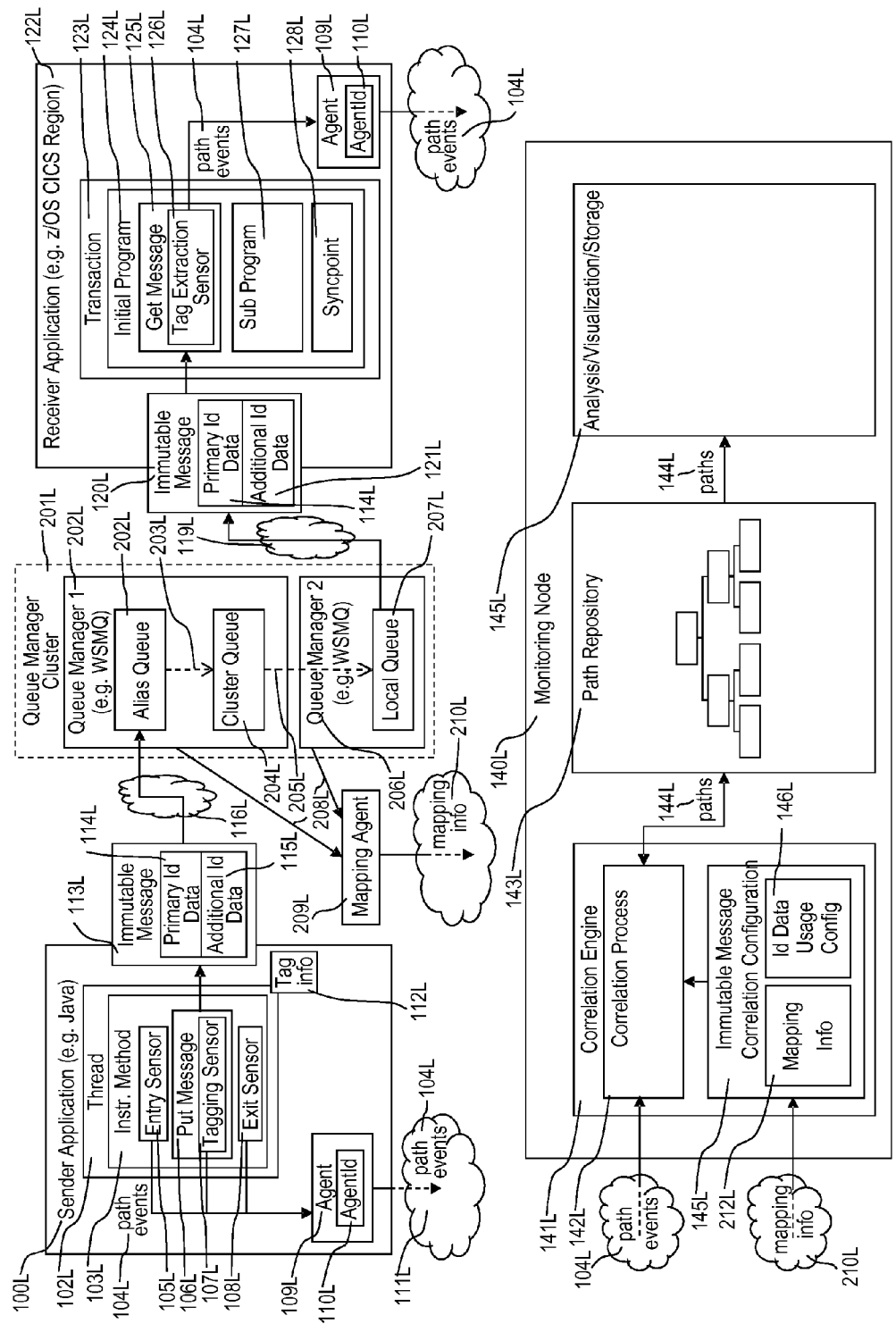
FIG. 2 is a block diagram of a monitored application using a clustered queue system for communication.

Referring now to FIG. 2, a conceptual overview of another scenario is provided, which shows transaction communication using immutable messages over a clustered messaging system. The described scenario shows a sender application 100L and a receiver application 122L which communicate by means of immutable messages 113L, and a monitoring system 140L receiving path events 104L and correlating those path events into end-to-end transaction tracing data.

The immutable message 113L is sent to a queue manager 1 202L which is part of a queue manager cluster 201L. The immutable message 113L is inserted into an alias queue 202L. An alias queue may be considered as a view of an existing queue with other queue identification data. As an example, for a physical queue A, multiple alias queues A', A" etc. may exist. A client application may put messages to A', A" or another alias queue. The message is physically added to or received from the queue A, but the client sees A' or A".

In the described scenario, the alias queue is an alias to a cluster queue 204L. Cluster queues are distributed queues shared by and visible to multiple queue managers 202L or 206L cluster managers.

The clustered queue 204L is visible to queue manager 1 202L and queue manager 2 206L. Queue manager 2 provides access to clustered queue via a local queue 207L.

The sender application 100L inserts the immutable message 113L into the alias queue 202L of queue manager 1. The resulting additional Id data 115L extracted by the tagging sensor 107L may be a queue manager name of "Queue Manager 1" and a queue name "Alias Queue". The message is physically inserted into the clustered queue 204L see message flow 203L. The clustered queue 204L is available at cluster manager 2 as local queue 207L. Messages inserted into the clustered queue 204L are visible on all queue managers participating in the clustered like queue manager 2 206L, see message flow 205L.

In this scenario, the receiver application reads the message sent from the sender application from a queue "local queue" of a queue manager "queue manager 2", see immutable message 120L with additional Id data 121L. In situations where additional Id data is required for correlation, the sender and receiver part of the transaction would erroneously not be linked due to not matching additional Id data.

To overcome this problem, a mapping agent 209L is introduced, which requests configuration data describing queue configurations, like names of queue managers and queues, names and mappings of alias queues, configurations of clustered queues and mappings of clustered queues to local queues. This queue configuration data is translated into mapping info that allows to map additional Id data extracted at the sender application to additional Id data extracted at the receiver application. In the described scenario, this mapping info would contain information that a queue "alias queue" of queue manager "queue manager 1" maps to a queue "local queue" of queue manager "queue manager 2".

This additional information allows the correlation process 142L to correctly link the transaction part that sends the message with the transaction part that receives the message.

The mapping info created by the mapping agent 209 is transferred to the monitoring node 140L using a computer network 210L. The monitoring node 140L stores the received mapping info in the mapping info section 212L of the immutable message correlation configuration 145L of the correlation engine 141L. The correlation process 142L uses the mapping info 212L together with the Id data usage config 146L to correlate path events 104L indicating the sending of immutable messages with path events 104L indicating the receiving of immutable messages.

In a slightly different message routing scenario, a sender application would place an immutable message into a queue of the queue manager. The messaging system would route the message to a message broker process, which reads the message from the queue system, transforms it, creates a different message with same primary message identification 114L as the received message, which is then inserted into another queue of the messaging system, which transfers the message to its final receiver. The message broker process is also equipped with an agent and instrumentations that detect and report received and sent messages and which also extract and send primary and additional message identification data. In cases where additional message Id data is not required for message identification, the tracing result may show invalid sequences of message processing by the message broker process and the receiver application, because the primary message identification data only allows to determine that a sender application sent a specific message which was then received and processed by a message broker and a receiver application. It does not allow to determine the sequence of both. In such a scenario, primary identification data allows to determine that the message was sent by two sender applications (original sender and message broker) and was received by two receives (message broker and final receivers). It does not allow to identify corresponding sender/receiver pairs. Using additional Id data 115L like queue name and queue manager name that allows to identify corresponding message queue end points, allows it to detect that the message was first received by the message broking process and then forwarded to the receiver application.

Figure 3:
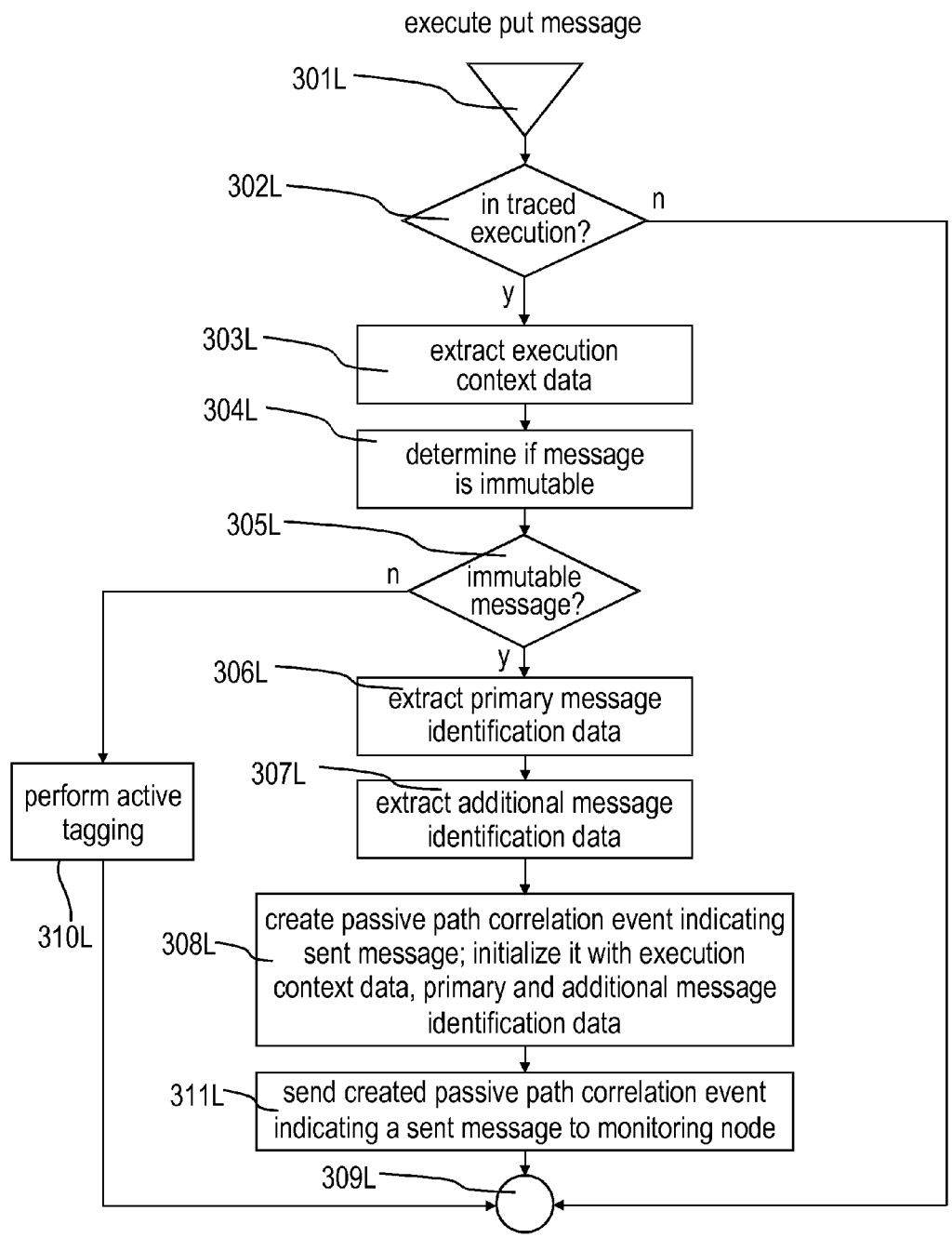
FIG. 3 is a flowchart depicting the execution of a tagging sensor which may be used to identify and report the sending of messages.

The process depicted in FIG. 3 illustrates the execution of a tagging sensor 107L. The execution of a tagging sensor is e.g. triggered when a put message method is executed, see step 301L. The tagging sensor first checks if the current execution is part of a monitored transaction execution. In case the put message call is not performed in the context of a monitored transaction, the process ends in step 309L. This check may be performed according to the teachings of the U.S. Pat. No. 8,234,631.

If the put message call is performed in the context of a monitored transaction execution, the process continues with step 303L to extract context information of the monitored execution, like e.g. a transaction Id or method call nesting level. Following step 304L detects if the message which should be sent is immutable. This may e.g. be determined by class name and method name of the specific put message method which is currently executed, by the class name of the message that is going to be sent or message configuration data. In case the type of the message allows modification, the process continues with step 310L and performs active tagging as described in the U.S. Pat. No. 8,234,631. The process then ends with step 309L.

Step 304L may be performed in different ways, depending on the used message sending functionality. The specific API method used to send a message may indicate an immutable message. As an example, the usage of a method specific for the WebSphere MQ message sending API, like a method "put" of class "com.ibm.mq.MQDestination" or of class "com.ibm.mq.MQQueue" may indicate an immutable message.

A sensor dedicated to the detection of message sending may e.g. determine to which method and class it is deployed and may choose the appropriate tagging mechanism according to the detected class and method name. A rule based bytecode instrumentation process, as e.g. described in U.S. Pat. No. 8,464,225 may e.g. instrument sensors using passive tagging mechanisms to the message sending API identified by method name "get" and class name "com.ibm.mq.MQDestination" or "com.ibm.mq.MQQueue" and may instrument sensors using active tagging mechanism to other message sending API methods.

Alternatively, information about the capabilities of the message receiver may be obtained and evaluated to determine if the message is immutable. As an example, WebSphere MQ provides a wrapping mechanism that allows posting standardized JMS messages. Those messages are internally translated to and sent as WebSphere MQ specific messages. JMS messages allow specification of message meta-data which can be used to transfer active tagging data. In the case of a translation to WebSphere MQ specific measures, the Web- Sphere MQ checks on translation if the receiver of the message is capable to handle such meta-data. In case the receiver can handle meta-data, existing meta-data is translated to a WebSphere MQ specific meta-data format and is then send to the receiver together with other message data. Otherwise, the meta-data is discarded. JMS messages provide a method "getJMSDestination" which provide data describing the message destination. In WebSphere MQ, this method returns an object that allows to determine if the message going to be sent allows to add meta-data and if the target client is capable to process meta-data. The methods "getTargetClient( )" and "getMessageBodyStile( )" in class "com.ibm.mq.jms.MQDestination" which are part of the WebSphere MQ messaging API, provide this information. A sensor may fetch this data and chose to use active tagging only if the message body style allows sending of meta-data and the target client is capable to process meta-data. Otherwise, the sensor may use passive tagging mechanisms.

In some cases it may not be possible by the sender application if active tagging can be used. This may e.g. occur when messages are routed via a third party message transfer system that e.g. removes meta-data from messages. As a consequence active tagging data would not reach the message receiver. To overcome such situations, manually generated tagging type configuration data may be provided by the user and used by the sensors. This tagging type configuration may e.g. define message sender/receiver pairs for which passive tagging should be used, regardless of the used message transfer mechanism.

In case check 305L detects that the message is immutable, the process continues with steps 306L and 307L which extract primary message identification data 114L and additional message identification data 115L from the message 113L which is going to be sent. The extracted execution context data, together with the extracted primary and additional message identification data are used to initialize a new created passive path correlation event node 701L indicating a sent message, which is then in step 311L sent to the monitoring node 140L via the agent 109L.

Figure 4:
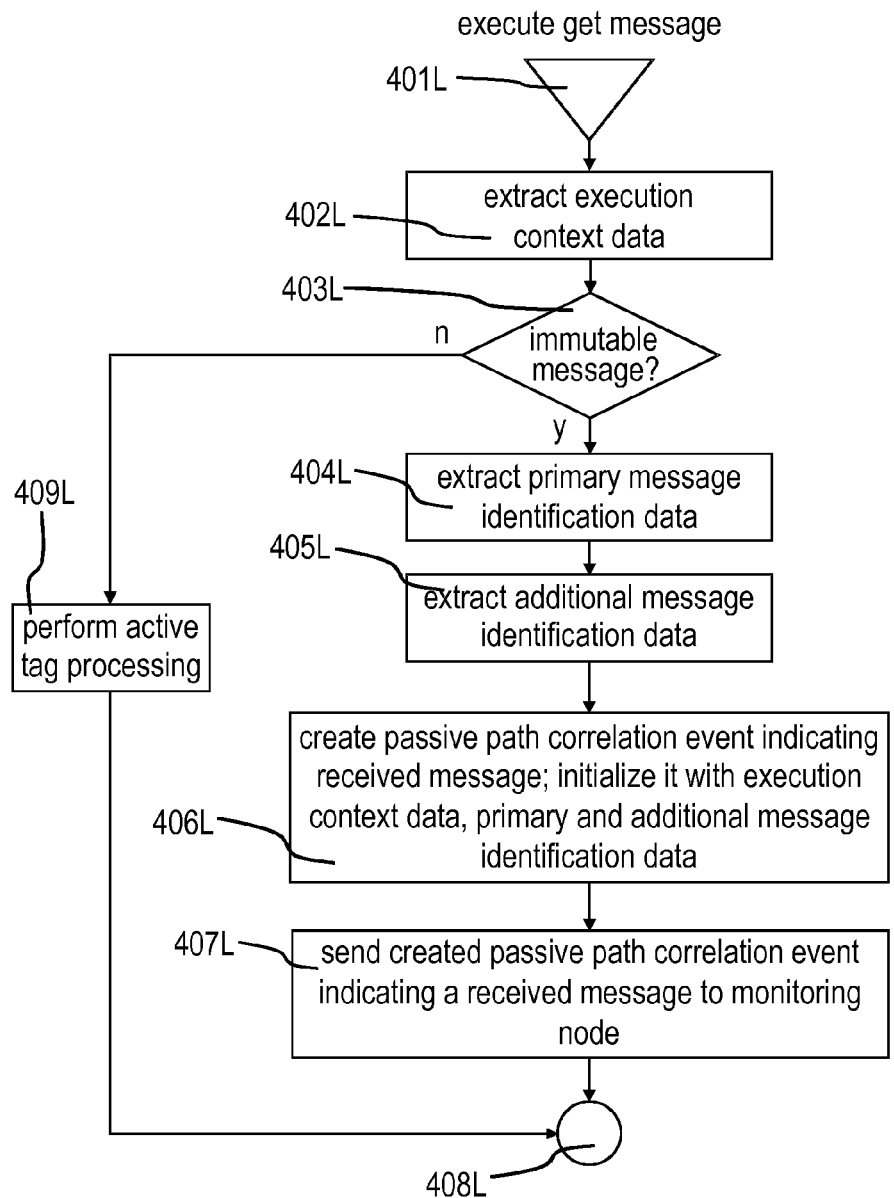
FIG. 4 is a flowchart depicting the execution of a tag extraction sensor which may be used to identify and report the receiving of messages.

The execution of a tag extraction sensor is shown in FIG. 4. The execution of a tag extraction sensor is triggered when a method or function that receives a message is called, like e.g. a get message function, see step 401L. In a first step 402L, execution context data, like enclosing method or function execution or a thread or program execution is extracted according to the teachings of U.S. Pat. No. 8,234,631. Afterwards, the process checks if it received an immutable message. The check may be performed similar to the check described in FIG. 3, process step 304L, using the name of class and method the sensor is instrumented to, parameters describing the communication medium used to transfer the message or describing the message sending application, or manual configuration data to decide which type of tagging was used.

In case a mutable message containing active tagging data was received, the process continues with step 409L and performs active tag processing according to the teachings of the U.S. Pat. No. 8,234,631. The process then ends with step 408L.

In case of a received immutable message, the process extracts primary and secondary identification data from the received message in steps 404L and 405L. Following step 406L creates a passive path correlation event node 701L, initializes it with the data extracted in the previous steps and sets the send/receive indicator 704L to indicate a received message. Subsequent step 407L sends the created passive path correlation event to the monitoring node 140L via the agent 109L deployed to the receiver application. The process then ends with step 408L.

Figure 5:
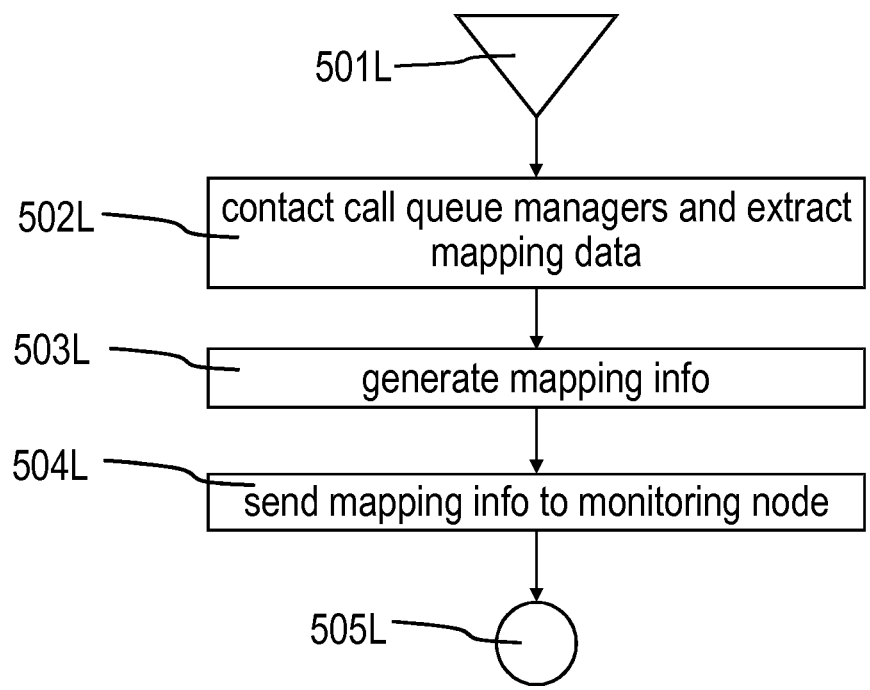
FIG. 5 is a flowchart depicting the process of fetching mapping data from a message queue system by a mapping agent.

The process performed by the mapping agent 209L to determine the mapping info is conceptually described in FIG. 5. The process starts with step 501L and is triggered either when the mapping agent 209L is started, or if a mapping data update is requested. In step 502L, the mapping agent 209L contacts all queue managers and extracts mapping data from them to create global mapping info data that describes overall message queue mappings in step 503L. The generated mapping info data 210L is then sent to the monitoring node 140L in step 504L and the process ends with step 505L.

It is obvious that there are multiple variations and improvements of a mapping agent possible that would not deviate from the scope and spirit of the application. A mapping agent could e.g. detect changes of the queue mappings of any queue manager and then automatically create and send updated mapping info data. Additionally, a mapping agent might either be configured to contact a predefined set of queue managers, or it may automatically detect available queue managers.

Figure 6:
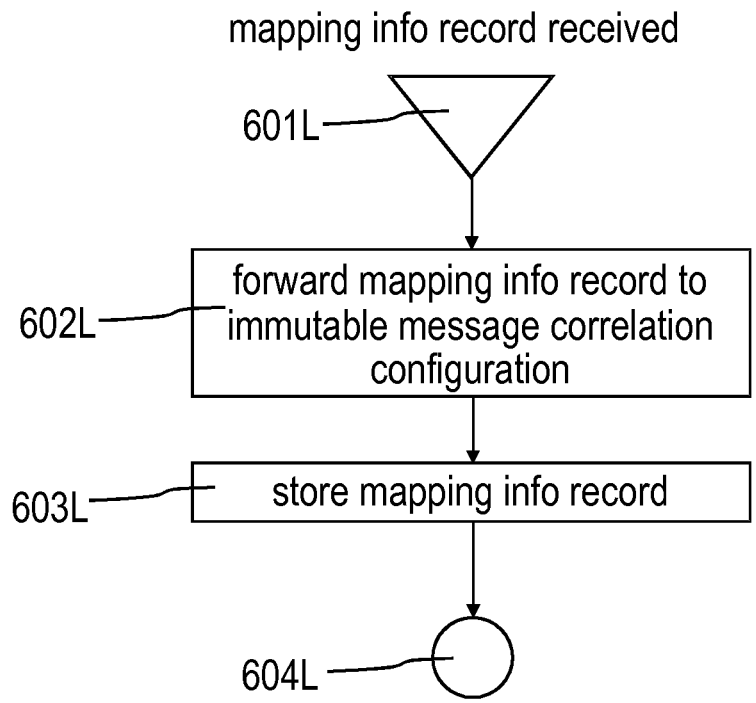
FIG. 6 is a flowchart depicting the handling of incoming mapping data by the monitoring system.

The handling of a received mapping info record 210L by the monitoring node 140L is described in FIG. 6. On receiving a mapping info data record from a mapping agent in step 601L, the monitoring node forwards it to the immutable message configuration module 145L in step 602L. Subsequent step 603L stores the mapping info data record in the mapping info section 212L of the immutable message correlation module 145L. The process then ends with step 604L.

Figure 7:
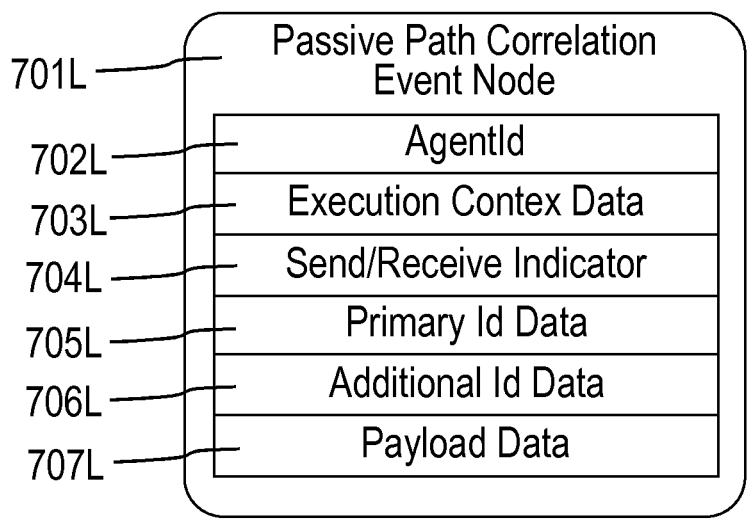
FIG. 7 is a diagram illustrating a passive path correlation node which is used to transport data representing a sent or received message from a sensor to the monitoring system.

FIG. 7 conceptually describes a passive path correlation event node 701L which may be used to transfer transaction tracing and correlation data indicating the sending or receiving of immutable messages by a monitored transaction. A passive path correlation event node 701L may contain but is not limited to an agentId 702L that identifies the process or program that sent or received the message, execution context data 703L identifying e.g. the enclosing transaction that sent or received the message, a send/receive indicator 704L indicating whether the event describes the sending or the receiving of a message, a primary Id data section 705L containing message identification data that identifies a message on application level, like a messageId, a correlationId or a message timestamp, and an additional Id data section containing additional message identification data like a queue name or a queue manager name which may be used to improve correlation accuracy.

Figure 8A:
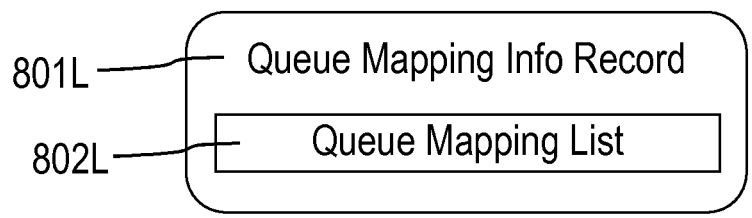
FIGS. 8A and 8B are a diagram illustrating the structure of mapping data fetched by the mapping agent.
Figure 8B:
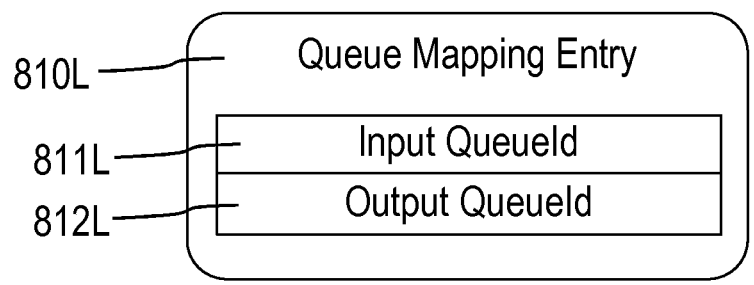

A conceptual overview of queue mapping data structure is shown in FIGS. 8A and 8B. A queue mapping info record 801L may contain a queue mapping list 802L, which may contain a set of queue mapping entries 810L. Each queue mapping entry 810L conceptually provides information to identify an input queue and a corresponding output queue in form of an input queueId 811L and an output queueId 812L. Input queueId 811L and output queueId 812L may contain but are not limited to a queue manager name and a queue name. They may contain other attributes required to uniquely identify a queue.

The XML file depicted in FIG. 9 shows an exemplary immutable message correlation configuration record. It contains an element <tagcontents> 901L, which is used to store id data usage configuration 146L used to correlate passive path correlation nodes. In the exemplary XML file, id data usage configuration 901L is set to use the primary message identification data msgid (messageId) and the additional message identification data qname (queue name) and qmgrname (queue manager name) for correlation. It also defines that the correlid (correlationId) which is part of the primary message identification data should not be used for correlation.

The subsequent elements of type <queumanager> and <queue> describe the detected queue managers, the queues defined on them and the relations between those queues.

The element <queuemanager> 902L describes a queue manager "QM1", and the nested <queue> element describes that the queue manager provides a queue "ALIAS_QUEUE". The attributes "type" and "basequeue" indicate that the queue is an alias queue and the name of physical queue it maps to is "CLUSTER_QUEUE". The element <cluster> 904L indicates that queue manager "QM1" is part of cluster "TESTCLUSTER".

Element <queuemanager> 905L describes a queue manager "QM2" and the queues it provides. The element <queue> 906L defines a local queue "CLUSTER_QUEUE" and the nested element <cluster> indicates that the queue is a clustered queue visible in the cluster "TESTCLUSTER". The element <cluster> 908L indicates that "QM2" is part of the cluster "TESTCLUSTER". The exemplary mapping implies that a queue "ALIAS_QUEUE" available on queue manager "QM1" is mapped to a queue "CLUSTER_QUEUE" on queue manager "QM2".

Figure 10:
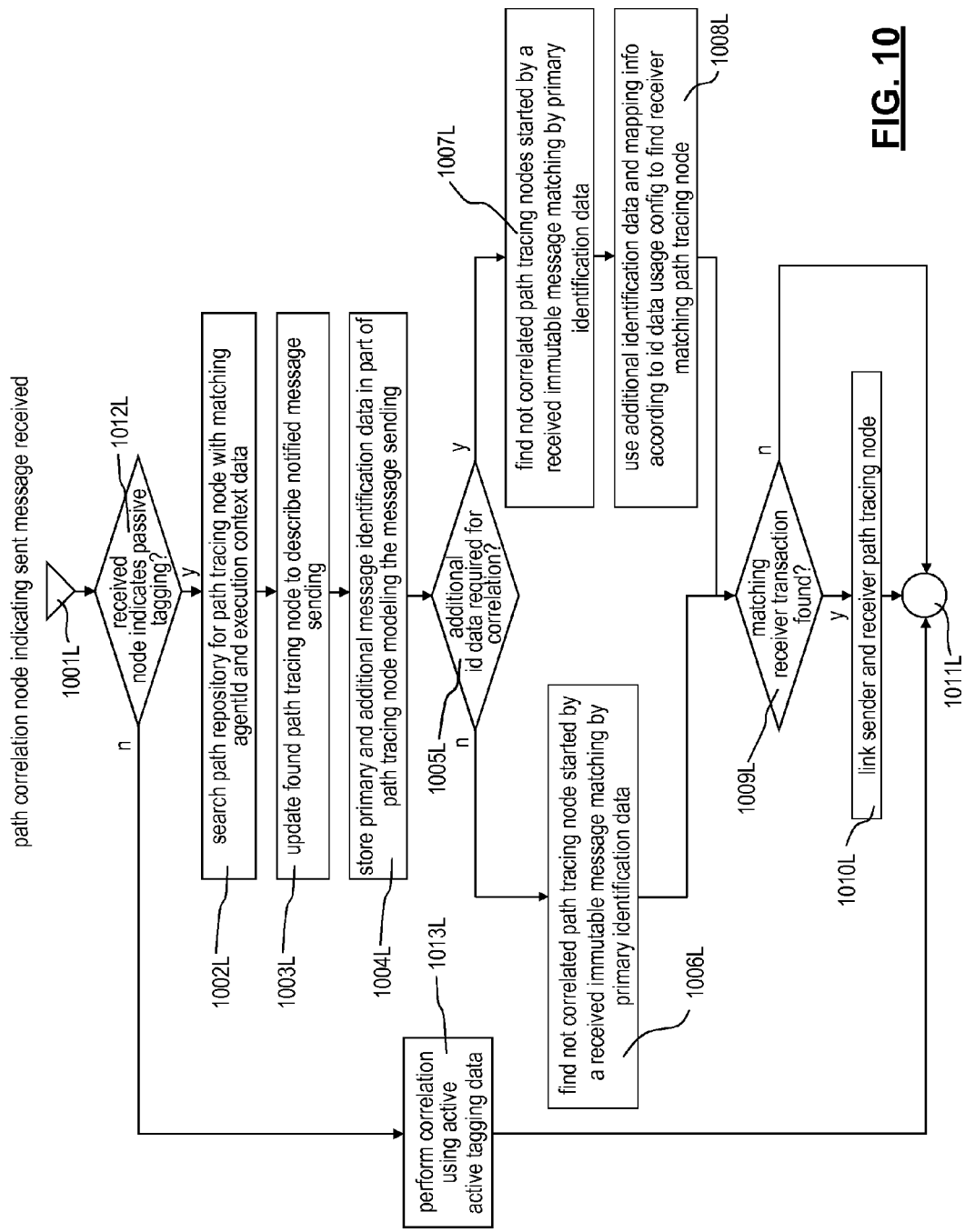
FIG. 10 is a flowchart depicting the processing of an event describing a sent message by the monitoring system.
Figure 11:
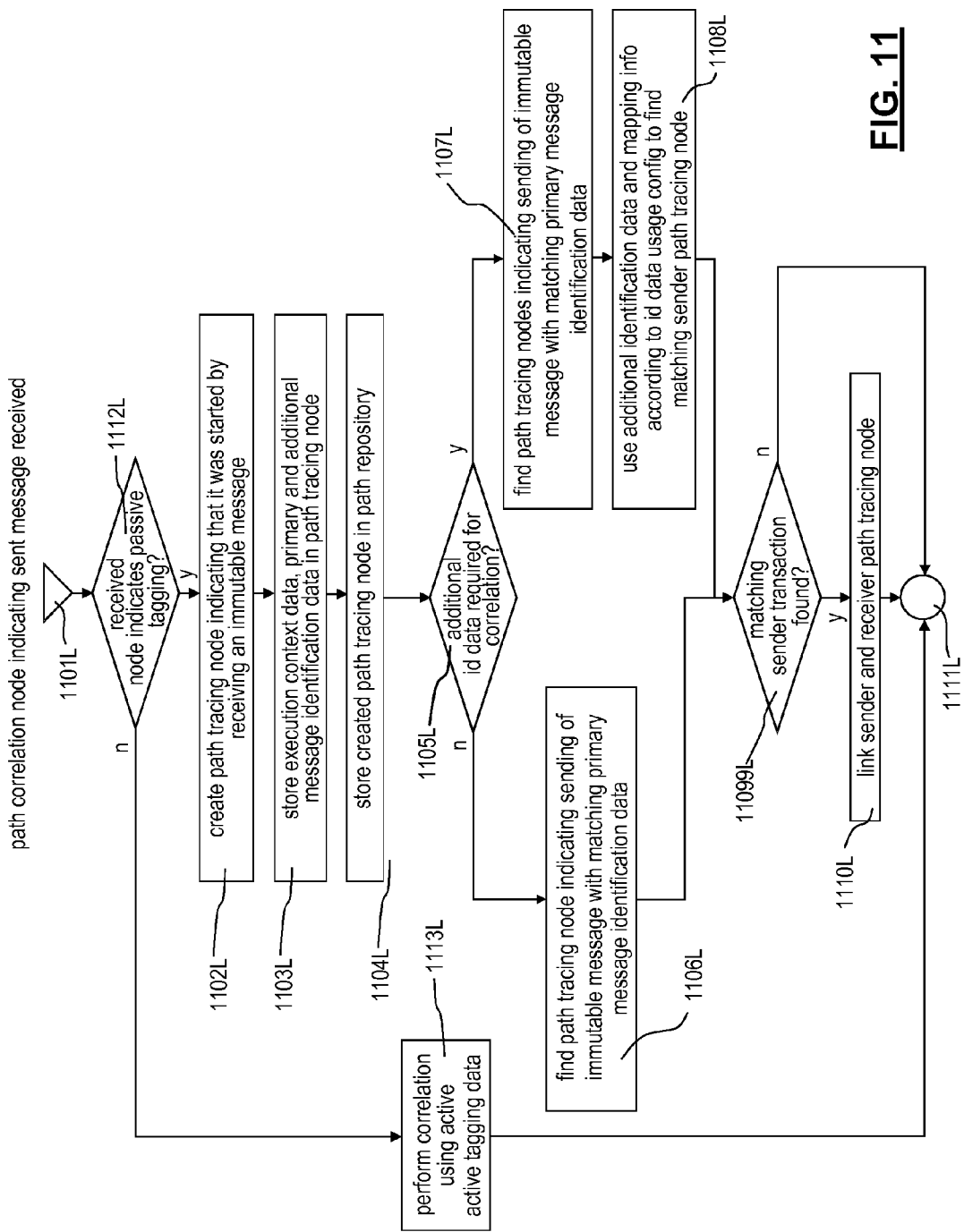
FIG. 11 is a flowchart depicting the processing of an event describing a received message by the monitoring system.

The processes shown in FIGS. 10 and 11 describe the processing of passive path correlation nodes indicating the sending and receiving of immutable messages by monitored transactions. Those processes may operate as part and improvement of a correlation process that creates end-to-end transaction tracing data out of individual received path nodes according to the teachings of U.S. Pat. No. 8,234,631.

FIG. 10 describes the processing of path correlation nodes indicating a sent message. An indicator like the send/receive indicator 704L of passive path correlation event nodes 701L may be used to determine if a received path correlation node describes the sending of a message. The process is triggered when the correlation process receives such an event, see step 1001L. Subsequent step 1012L determines if the received path correlation node indicates the usage of passive tagging mechanisms. This may e.g. be performed by checking if the received path correlation node is a passive path correlation node 701L. In case the path correlation node is not a passive path correlation node but another type of path correlation node indicating the usage of active tagging mechanisms as described in U.S. Pat. No. 8,234,631, the process continues with step 1013L which performs correlation based on active tagging data as also described in U.S. Pat. No. 8,234,631. The process then ends with step 1011L.

In case step 1012L determines that a passive path correlation node 701L was received, following step 1002L searches the path repository 143L for the path tracing node describing the transaction and thread execution that sent the indicated message. This may be performed by comparing agentId 702L and execution context data 702L (e.g. threadId, method call level) of the received event node 701L with corresponding data of the path tracing nodes available in the path repository 143L.

Subsequent step 1003L updates the found path tracing node to indicate the notified method sending, by e.g. adding a sub node to the existing path tracing node describing the reported message sending. This sub node may contain but is not limited to a send/receive indicator, a primary identification data field and an additional identification data field. Those may be set to the corresponding values of the received passive path correlation event node. Additionally, this sub node may contain an indicator that identifies the described message sending as the sending of an immutable message.

Following step 1005L uses the id data usage configuration 146L to check if additional identification data is required for the correlation of immutable messages. In case no additional identification data is required, the process continues with step 1006L, which searches the path repository 143L for a not correlated path tracing node indicating that it was started by the receiving of an immutable message with matching primary identification data. This may e.g. be performed by searching for a path tracing node with an initial sub node indicating the receiving of an immutable message, which is not yet linked with a corresponding path tracing node describing the sending of an immutable message.

The process then continues with step 1009L which checks if a matching path tracing node describing the receiving and processing of the message has been found. In case no matching receiver path tracing node is found, the process ends with step 1011L. Otherwise, step 1010L links the found path tracing node with the path tracing node indicating the sending of the message found in step 1002L. The process ends with step 1011L.

In case step 1005L determines that additional message identification data is required for correlation, the process continues with step 1007L, which is identical to step 1006L, except that it may provide more than one potentially matching receiver path tracing node, because primary identification data is not sufficient to uniquely identify the path tracing node describing the transaction part that received and processed the message.

Subsequent step 1008L uses additional correlation data and mapping info 212L according to the settings stored in the id data usage config 146L to identify the matching receiver path tracing node out of the multiple receiver path trace nodes fetched by step 1007L.

Assuming the exemplary immutable message correlation configuration described in FIG. 9, an already existing receiver path tracing node indicating a transaction started by the receiving of a message from a queue "CLUSTER_QUEUE" managed by a queue manager "QM2" with a messageId "1" and a received passive path correlation event node 701L with messageId "1" (primary id data), queue name "ALIAS_ QUEUE" and queue manager name "QM1", step 1007L would select the receiver path tracing node because of the matching primary message identification data (messageIds match). Subsequent step 1008L would then, according to the correlation configuration 212L check if queue name and queue manager name match. Using the mapping info 212L, step 1008L may determine that the queue "ALIAS_QUEUE" of queue manager "QM1" maps to the queue "CLUSTER_ QUEUE" of queue manager "QM2" and consequently identify the existing receiver path tracing node as matching the received passive path correlation event node 701L.

After step 1008L is finished, the process continues with steps 1009L and following.

FIG. 11 shows the processing of a path correlation node indicating a received message. The process is triggered when a path correlation node is received by the correlation process 142L see step 1101L. Following step 1112L checks if the received path correlation node indicates usage of active or passive tagging mechanisms, by e.g. checking if the received path correlation node is a passive path correlation node 701L. In case step 1112L identifies the usage of active tagging mechanism, correlation is performed in step 1113L according to the teachings of U.S. Pat. No. 8,234,631 and the process afterwards ends with step 1111L. Otherwise, step 1102L creates a path tracing node describing a transaction execution triggered by a received immutable message. The path tracing node is created in a way to indicate that it is not yet linked with a corresponding path tracing node describing the sending of the received message.

Following step 1103L initializes the created path tracing node with execution context data, primary and additional message identification data from the received passive path correlation node 701L and step 1004L stores it in the path repository 143L.

Afterwards, step 1105L determines, using the id data usage config 146L, if additional message identification data is required for correlation. In case no additional data is required, the process continues with step 1106L which fetches the path tracing node describing the corresponding sender counterpart from the path repository 143L. If such a counterpart exists, the path tracing node describing the received message and the found sending counterpart are linked in step 1110L and the process ends with step 1111L.

In case step 1105L determines that additional identification data is required, the process continues with step 1107L, which filters potentially matching sender counterparts from the path repository using primary message identification data. Step 1107L is followed by step 1108L which uses additional message identification data and mapping information according to the id data usage config 146L to identify the matching sender counterpart out of the candidates identified in step 1107L. The process then continues with steps 1109L and following.

Various optimizations and alterations of the processes described in FIGS. 10 and 11 are possible without leaving the scope and spirit of the invention. These include, but are not limited to processing the mapping info data and converting it into a form that allows faster lookups for correlation, process message identification data (705L, 706L) on arrival of the passive path correlation events in a way to allow a more efficient comparison and to avoid the checks 1009L or 1105L.

The tagging sensor processing as shown in FIGS. 3 and 4, together with the correlation processes depicted in FIGS. 10 and 11 describe a transaction tracing and monitoring system that automatically adapts both message tagging and transaction trace correlation processes according to the mutability of used messages. For messages allowing the transfer of additional monitoring system specific correlation data from sender to receiver, an active tagging approach is selected. In case the monitoring system detects usage of immutable messages, which do not allow the transfer of additional correlation data from sender to receiver, it automatically switches to a passive tagging mechanism.

Figure 12:
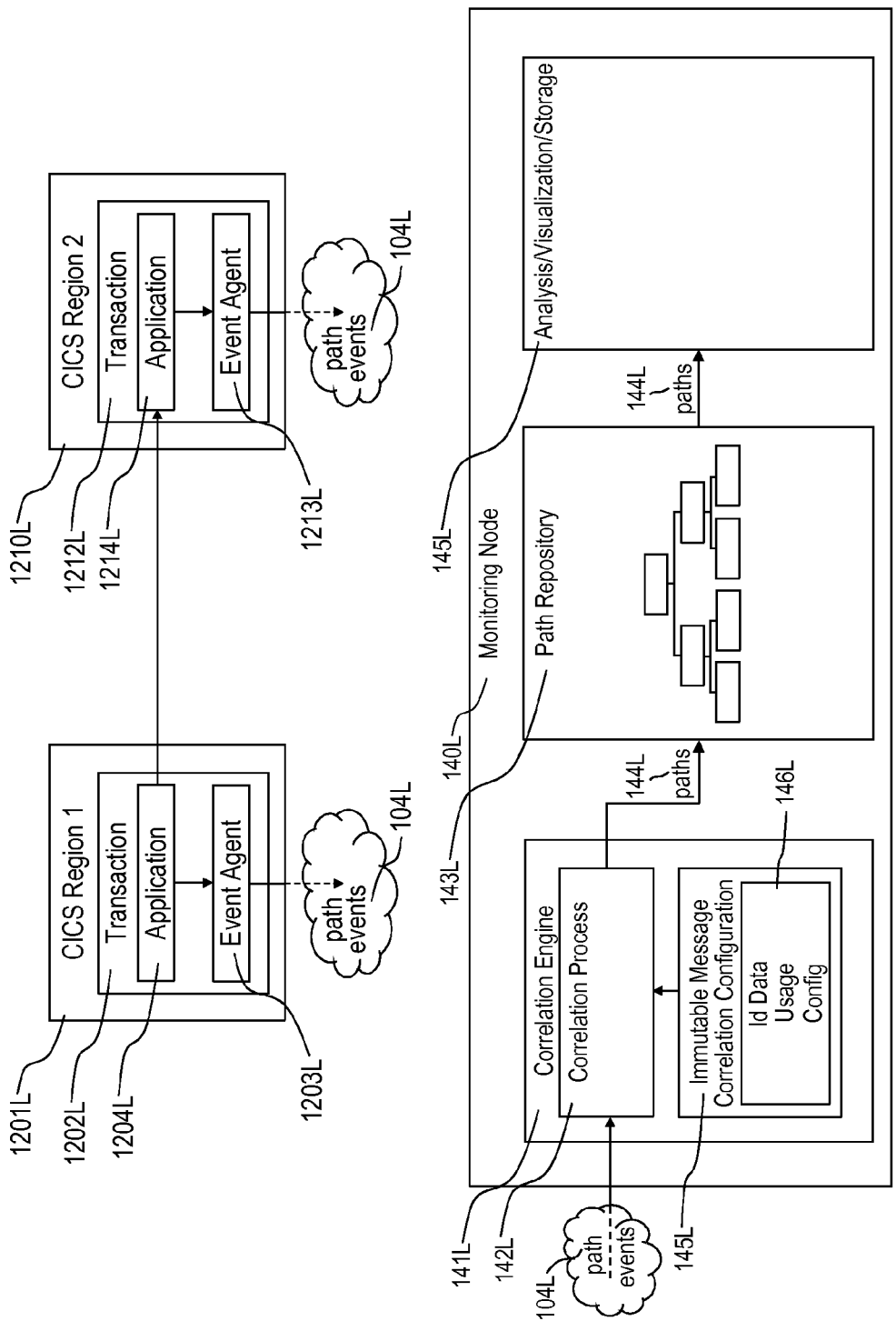
FIG. 12 is a block diagram of an application using a distributed program link for communication and a monitoring system configured to monitor the application.

Additionally, the monitoring system may be extended to applications executing in a mainframe environment as shown in FIG. 12. In another embodiment, the monitoring system includes agents and sensors deployed in a CICS environment. In this example, an event agent 1203L is deployed in the first CICS region 1201L. The event agent 1203L may be invoked using user exits by a transaction server operating in the associated CICS region 1201L.

During operation, the event agent 1203L monitors transaction requests made by applications 1204L executing in the CICS region 1201L. For example, the application 1204L may start another transaction in the same CICS region or a different CICS region as shown. In a similar manner, user exits may be used to transfer control to the event agent 1203L when a link is made by the application 1204L to another transaction 1212L. The event agent 1203L determines identifying information for the transaction request. In the context of a CICS transaction gateway, the identifying information for the application transaction request depends on the mechanism by which the transaction request is passed on to the transaction manager. For the IPIC protocol, the ApplidQualifier and the Applid, along with the timestamp, uniquely identifies the application transaction. For the EXCI protocol, the ApplidQualifier and the Applid, along with a modified timestamp, uniquely identifies the application transaction, where the timestamp is appended with a two byte binary sequence number to ensure uniqueness. The event agent 1203L then generates a path event and sends the path event to the correlation engine 141L. The path event includes the identifying information for the transaction request which can be used by the correlation engine to correlate with other events captured in the mainframe environment. Thus, the event agent 1203L operate in a similar manner as the agents in the monitoring system described above. Further information regarding such event agents can be found in U.S. patent application Ser. No. 13/910,587 entitled "System And Methods For Tracing Individual Transactions Across A Mainframe Computing Environment" which is incorporated by reference in its entirety herein.

In some embodiments, the event agent 1203L can also determine transaction context information. In the CICS environment, association data is the set of information that describes the environment in which user tasks run and the way that user tasks are attached in a region. This association data is made available and can serve as the transaction context information. Thus, the event agent 1203L can further append the transaction context information to the event messages sent to the correlation engine. Lastly, the link to the second CICS region 1210L can spawn another instance of an event agent 1213L executing in the second CICS region 1210L. The event agent 1213L may extract transaction context information identifying the transaction initiating the link and append the transaction context information to an event message it sends to the correlation engine. In this way, all of the sub-paths in the mainframe environment can be linked back to the originating sub-path to form one continuous path that described the entire user transaction. While an additional example of the monitoring system has been described in FIG. 12, it is again readily understood that the broader aspects of this disclosure can be extended to other types of communication mechanisms as well.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for tracing a distributed transaction by a monitoring system across a distributed computing environment, comprising:
    detecting, by a tagging sensor instrumented in a send application, a request by the send application to send a message using a messaging mechanism, where the sensor is executing on a computing device;
    determining, by the tagging sensor, whether the message to be sent can be altered by the monitoring system;
    determining, by the tagging sensor, identifying information for the message, where the identifying information for the message is assigned by at least one of the send application or the messaging mechanism;
    generating, by the tagging sensor, a first passive path correlation event indicating that the message was sent using the messaging mechanism, where the first passive path correlation event includes an identifier for the sensor, an identifier for execution path of the send application and the identifying information for the message; and
    sending, by the tagging sensor, the first passive path correlation event across a network to a correlation engine residing on a server located remotely from the computing device, where the steps of determining identifying information for the message, generating a first passive path correlation event and sending the first passive path correlation event are performed in response to a determination that the message cannot be altered.

2. The method of claim 1 wherein determining whether the message to be sent can be altered further comprises determining at least one of a name of a method or a class used to send the message and determining whether the message can be altered based on the name of the method or class.

3. The method of claim 1 further comprising determining, by the tagging sensor, identifying information for the send application and appending the identifying information for the send application to the first passive path correlation event generated by the sensor.

4. The method of claim 3 wherein determining identifying information for the send application further comprises determining an identifier for the message.

5. The method of claim 1 further comprising sending, by the send application, the message across a network to a receive application by sending the message to a queue manager of a message oriented middleware.

6. The method of claim 5 wherein determining identifying information for the message further comprises determining at least one of an identifier for the queue manager or an identifier for a message queue.

7. The method of claim 5 further comprising
    detecting, by a tag extraction sensor instrumented in the receive application, receipt of the message by the receive application;
    determining, by the tag extraction sensor, whether the received message can be altered by the monitoring system;
    determining, by the tag extraction sensor, identifying information for the message;
    generating, by the tag extraction sensor, a second passive path correlation event indicating that the message was received, where the second passive path correlation event includes the identifier for the tagging sensor and the identifier for the execution path; and
    sending, by the tag extraction sensor, the second passive correlation event across the network to the correlation engine, where the steps of determining identifying information for the message, generating a second passive path correlation event and sending the second passive path correlation event are performed in response to a determination that the message cannot be altered.

8. The method of claim 7 further comprises
    receiving, by the correlation engine, the first passive path correlation event;
    receiving, by the correlation engine, the second passive path correlation event; and associating, by the correlation engine, the first passive path correlation event with the second passive path correlation event based in part on the identifying information for the message.

9. The method of claim 5 further comprises determining, by a mapping agent, mapping information for the queue manager, where the mapping information includes a mapping between a first alias queue and a second alias queue;

sending, by the mapping agent, the mapping information across the network to a correlation engine; and correlating, by the correlation engine, the first passive path correlation event with the second passive path correlation event using the mapping information.

10. The method of claim 9 wherein determining mapping information further comprises contacting each queue manager in the message queuing service and extracting the mapping information therefrom.

11. The method of claim 9 wherein the mapping information is defined as a queue manager name and a queue name for the first and second alias queues.

12. The method of claim 11 wherein the mapping information is further defined as any intermediary queues interconnecting the first alias queue to the second alias queue.

13. The method of claim 12 wherein the first alias queue, the second alias queue and any intermediary queues are maintained by different queue managers.

14. A computer-implemented method for tracing a distributed transaction by a monitoring system across a distributed computing environment, comprising:

detecting, by a tagging sensor instrumented in a send application, a request by the send application to send a message using a messaging mechanism, where the sensor is executing on a computing device;

determining, by the tagging sensor, whether the message to be sent can be altered by the monitoring system;

determining, by the tagging sensor, identifying information for the message, where the identifying information for the message is not assigned to the message by the tagging sensor;

generating, by the tagging sensor, a first passive path correlation event indicating that the message was sent using the messaging mechanism, where the first passive path correlation event includes the identifier for the sensor, the identifier for the execution path and the identifying information for the message;

sending, by the tagging sensor, the first passive path correlation event across a network to a correlation engine residing on a server located remotely from the computing device, where the steps of determining identifying information for the message, generating a first passive path correlation event and sending the first passive path correlation event are performed in response to a determination that the message cannot be altered;

tagging, by the tagging sensor, the message with an identifier for the sensor and an identifier for an execution path which spawn the message, the tagging being performed in response to a determination that the message can be altered; and sending, by the send application, the message across the network.

15. The method of claim 14 wherein determining whether the message to be sent can be altered further comprises determining at least one of a name of a method or a class used to send the message and determining whether the message can be altered based on the name of the method or class.

16. The method of claim 14 further comprising determining, by the tagging sensor, identifying information for the send application and appending the identifying information for the send application to the first passive path correlation event generated by the sensor.

17. The method of claim 16 wherein determining identifying information for the send application further comprises determining an identifier for the message.

18. The method of claim 14 further comprising sending, by the send application, the message across a network to a receive application by sending the message to a queue manager of a message oriented middleware.

19. The method of claim 18 wherein determining identifying information for the message further comprises determining an identifier for the queue manager and an identifier for a message queue.

20. The method of claim 18 further comprising detecting, by a tag extraction sensor instrumented in the receive application, receipt of the message by the receive application;

determining, by the tag extraction sensor, whether the received message can be altered by the monitoring system;

determining, by the tag extraction sensor, identifying information for the received message;

generating, by the tag extraction sensor, a second passive path correlation event indicating that the message was received, where the receive event includes the identifier for the tagging sensor, the identifier for the execution path and the identifying information for the received message; and sending, by the tag extraction sensor, the second passive correlation event across the network to the correlation engine, where the steps of determining identifying information for the received message, generating the second passive path correlation event and sending the second passive correlation event are performed in response to a determination that the message cannot be altered.

21. The method of claim 20 further comprises receiving, by the correlation engine, the first passive path correlation event;

receiving, by the correlation engine, the second passive path correlation event; and associating, by the correlation engine, the first passive path correlation event with the second passive path correlation event based in part on the identifying information for the message.

22. The method of claim 20 further comprises extracting, by the tag extraction sensor, from the received message the identifier for the sensor and the identifier for an execution path which spawn the message; and sending, by the tag extraction sensor, an active correlation event across the network to the correlation engine, where the steps of extracting from the received message and sending the active correlation event are performed in response to a determination that the received message can be altered.

23. A performance management system for tracing a distributed transaction across a network in a distributed computing environment, comprising:

a send application residing on a first computing device and configured to send a message across the network using a messaging mechanism;

a tagging sensor instrumented in the send application that detects a request by the send application to send the message and determines whether the message can be altered by the tagging sensor, wherein the tagging sensor further operates, in response to a determination that the message cannot be altered, to determine identifying information for the message, generate a first passive path correlation event indicating that the message was sent using the messaging mechanism and send the first passive path correlation event across the network to a correlation engine, where the first passive path correlation event includes the identifying information for the message;

a receive application residing on a second computing device and configured to receive the message sent by the send application;

a tag extraction sensor instrumented in the receive application that detects receipt of the message by the receive application and determines whether the message can be altered, wherein the tag extraction sensor further operates to determine identifying information for the message, generate a second passive path correlation event indicating that the message was received and send the second passive path correlation event across the network to the correlation engine, where the second correlation path event includes the identifying information for the message;

the correlation engine residing on a server located remotely across the network from the first and second computing devices, the correlation engine configured to receive the first passive path correlation event, to receive the second passive path correlation event and associate the first passive path correlation event with the second passive path correlation event based on the identifying information for the message extracted from the first and second passive path correlation events.

24. The performance management system of claim 23 wherein the identifying information for the message further comprises an identifier assigned by the messaging mechanism.

25. The performance management system of claim 24 wherein the messaging mechanism is further defined as a queue manager of a message oriented middleware and the identifying information for the message further includes at least one of an identifier for the queue manager or an identifier for a message queue.

26. The performance management system of claim 24 wherein the first and second passive path correlation events include an identifier for the tagging sensor and an identifier for execution path of the send application.

27. The performance management system of claim 24 wherein tagging sensor, in response to a determination that the message can be altered, tags the message with an identifier for the tagging sensor and an identifier for an execution path which sent the message.

28. A computer-implemented method for tracing a distributed transaction across a network of a distributed computing environment, comprising:
    determining, by a tagging sensor instrumented in a send application, whether a message can be altered;
    tagging, in response to a determination that the message can be altered, the message with an identifier for the tagging sensor and an identifier for an execution path which sent the message;
    sending the message from the send application to a receive application, where the send application is instrumented by a tag sensor and the message excludes information about execution path of the send application that was generated by the tag sensor and the send application resides on a first computing device located remotely across the network from a second computing device hosting the receive application;
    sending, in response to the message being sent by the send application and in response to a determination that the message cannot be altered, a first passive path correlation event from the first computing device to a correlation engine residing on a server located remotely across the network from the first computing device, where the first passive correlation event includes identifying information for the message;
    sending, in response to the message being received by the receive application, a second passive path correlation event from the second computing device to the correlation engine, where the second passive correlation event includes identifying information for the message which is same as the identifying information for the message included in the first passive correlation event; and
    associating, by the correlation engine, the first passive path correlation event with the second passive path correlation event based on the identifying information for the message, thereby linking tracing data describing the transaction part executed by the send application with tracing data describing the transaction part executed by the receive application.

29. The method of claim 28 wherein the identifying information is assigned by a message mechanism used to send the message from the send application to the receive application.

* * * * *